(12) United States Patent
Lequesne et al.

(10) Patent No.: US 6,873,151 B2
(45) Date of Patent: Mar. 29, 2005

(54) SENSOR ASSEMBLY FOR SENSING ANGULAR POSITION

(75) Inventors: Bruno P. B. Lequesne, Troy, MI (US); Avoki M. Omekanda, Rochester, MI (US); Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/615,561

(22) Filed: Jul. 8, 2003

(65) Prior Publication Data

US 2005/0007104 A1 Jan. 13, 2005

(51) Int. Cl.$^7$ .................................................. G01B 7/30
(52) U.S. Cl. .................................. 324/207.25; 324/205
(58) Field of Search ........................ 324/207.11–207.23, 324/207.25, 234–235, 240–243, 244, 260, 205; 123/612, 617

(56) References Cited

U.S. PATENT DOCUMENTS

| | | | |
|---|---|---|---|
| 4,401,944 A | 8/1983 | Narimatsu et al. | |
| 4,719,419 A | 1/1988 | Dawley | |
| 5,831,596 A | * 11/1998 | Marshall et al. | 345/161 |
| 6,201,389 B1 | 3/2001 | Apel et al. | |
| 6,215,299 B1 | 4/2001 | Reynolds et al. | |
| 6,268,721 B1 | 7/2001 | Schroeder et al. | |
| 6,291,989 B1 | 9/2001 | Schroeder | |
| 6,320,374 B1 | 11/2001 | Schroeder | |
| 6,346,808 B1 | 2/2002 | Schroeder | |
| 6,424,896 B1 | 7/2002 | Lin et al. | |
| 6,429,647 B1 | 8/2002 | Nicholson | |
| 6,443,020 B1 | 9/2002 | Lin et al. | |
| 6,489,761 B1 | 12/2002 | Schroeder et al. | |
| 6,518,750 B1 | 2/2003 | Lin et al. | |
| 6,519,549 B1 | 2/2003 | Lin et al. | |
| 6,538,429 B2 | 3/2003 | Schroeder et al. | |
| 6,566,860 B1 | 5/2003 | Lin et al. | |
| 6,576,890 B2 | 6/2003 | Lin et al. | |
| 6,639,399 B2 | 10/2003 | Schroeder et al. | |
| 2002/0190709 A1 | 12/2002 | Frederick et al. | |

OTHER PUBLICATIONS

U.S. Appl. No. 09/557,390, filed Apr. 24, 2000, Schroeder et al.

* cited by examiner

Primary Examiner—Bot LeDynh
(74) Attorney, Agent, or Firm—Jimmy L. Funke

(57) ABSTRACT

A sensor assembly for sensing angular position of an object is provided. The assembly may comprise at least one magneto-sensing magnet having a second axis of rotation. The assembly may further comprise a magnet having a second axis of rotation. At least one of the magnet and the magneto-sensing element are rotatable relative to the other. The respective axes of rotation of the magneto-sensing element and the magnet are non-coincident with respect to one another. The magnet is magnetized along one of the following directions: an axial direction and a radial direction.

24 Claims, 6 Drawing Sheets

US 6,873,151 B2

SENSOR ASSEMBLY FOR SENSING ANGULAR POSITION

FIELD OF THE INVENTION

The present invention is generally related to motor vehicle sensors, and, more particularly, the present invention is directed to a sensor assembly for contactlessly detecting the angular position of a rotatable object.

BACKGROUND OF THE INVENTION

Modern motor vehicles are equipped with numerous sensors that provide detailed information regarding the operation of the vehicle. This information may be displayed for a driver or it may be processed and provided to various vehicle control systems. For example, an analog position sensor can provide both position information and outputs that can be used to drive an electric motor or other electromechanical devices. Many of these devices may be driven by sinusoidal excitations that vary as a function of position.

Consequently, an analog position sensor having an output that varies sinusoidally with position could be used to generate absolute angular positions as may be used in an electrical power steering system to measure the angle of rotation of the steering wheel, and/or generate reference signals to produce the desired sinusoidal phase drive currents and voltages to, for example, drive an electric motor. Applications may further include throttle position sensors, pedal position sensors in drive-by-wire systems, body height position sensors for automotive suspension systems, 3-phase sine generators for brushless motors, sine/cosine resolvers for servo motors, etc.

Although resistive-film sensors are commonly used, such sensors, however, would undesirably require a sliding contact. The use of Hall devices and magnetoresistors (MRs) sensors as contactless position sensors is well known in the art.

The operational principle of an angle encoder sensor is based upon the property of some sensing elements, collectively referred to herein as "sensing elements" or "magneto-sensing elements" to sense a component of the magnetic field passing through them. Example of such sensing elements may be Hall plates and semiconductor magnetoresistors, which sense essentially the normal component of the magnetic field passing through them. Other sensing elements, such as anisotropic magnetoresistors (AMRs), may sense essentially a co-planar component of the magnetic field passing through them.

These sensors, unfortunately, may be sensitive to eccentric placement of various components that make up the sensor, such as eccentricity of the sensed target. Moreover, if a steel ring with slits or similar structure is placed around the magnet, then such a structure tends to create discontinuities along the periphery of the magnet, thus affecting the integrity of the sinusoidal waveform of the magnetic flux.

In some angular sensing applications, there is a need of a sensor exhibiting substantial linearity over its range of operation. Unfortunately, such a substantial linearity may often be achieved just through the use of costly and complex signal processing circuitry that consumes valuable real estate in size-constrained applications.

Thus, it would be desirable to provide a compact and inexpensive contactless angular position sensor having a sinusoidally varying output and/or exhibiting good linear characteristics suitable for multiple sensing schemes and without having to utilize complex circuitry.

SUMMARY OF THE INVENTION

Generally, the present invention fulfills the foregoing needs by providing in one aspect thereof, a sensor assembly for sensing angular position of an object. The assembly comprises at least one magneto-sensing element having a first axis of rotation. The assembly further comprises a magnet having a second axis of rotation. At least one of the magnet and the magneto-sensing elements may be rotatable relative to the other and the respective axes of rotation of the magneto-sensing element and the magnet are non-coincident with respect to one another. The magnet is magnetized along one of the following directions: an axial direction and a radial direction.

In another aspect thereof, the present invention further fulfills the foregoing needs by providing a sensor assembly for sensing angular position of an object. The assembly comprises at least one magneto-sensing element. The assembly further comprises a cylindrical magnet having an axis of rotation and a geometrical axis. The magnet may be rotatable relative to the at least one magneto-sensing element. The cylindrical and geometric axes of the magnet are non-coincident with respect to one another. The magnet is magnetized along one of the following directions: an axial direction and a radial direction.

BRIEF DESCRIPTION OF THE DRAWINGS

These and other advantages of the invention will be more apparent from the following description in view of the drawings that show:

FIGS. 1 and 2 illustrate an exemplary embodiment of a sensor assembly embodying aspects of the present invention, and using an axially magnetized magnet, wherein FIG. 1 shows a too view, and FIG. 2 shows a cross-sectional view of the sensor assembly.

FIG. 4 further shows respective waveforms comprising the difference between the two signals, and the sum of the two signals.

FIGS. 7 and 8 illustrate an exemplary embodiment of a sensor assembly embodying aspects of the present invention, and using a radially magnetized magnet, wherein FIG. 7 shows a top view, and FIG. 8 shows a cross-sectional view of the sensor assembly.

DETAILED DESCRIPTION OF THE INVENTION

Figure 1:
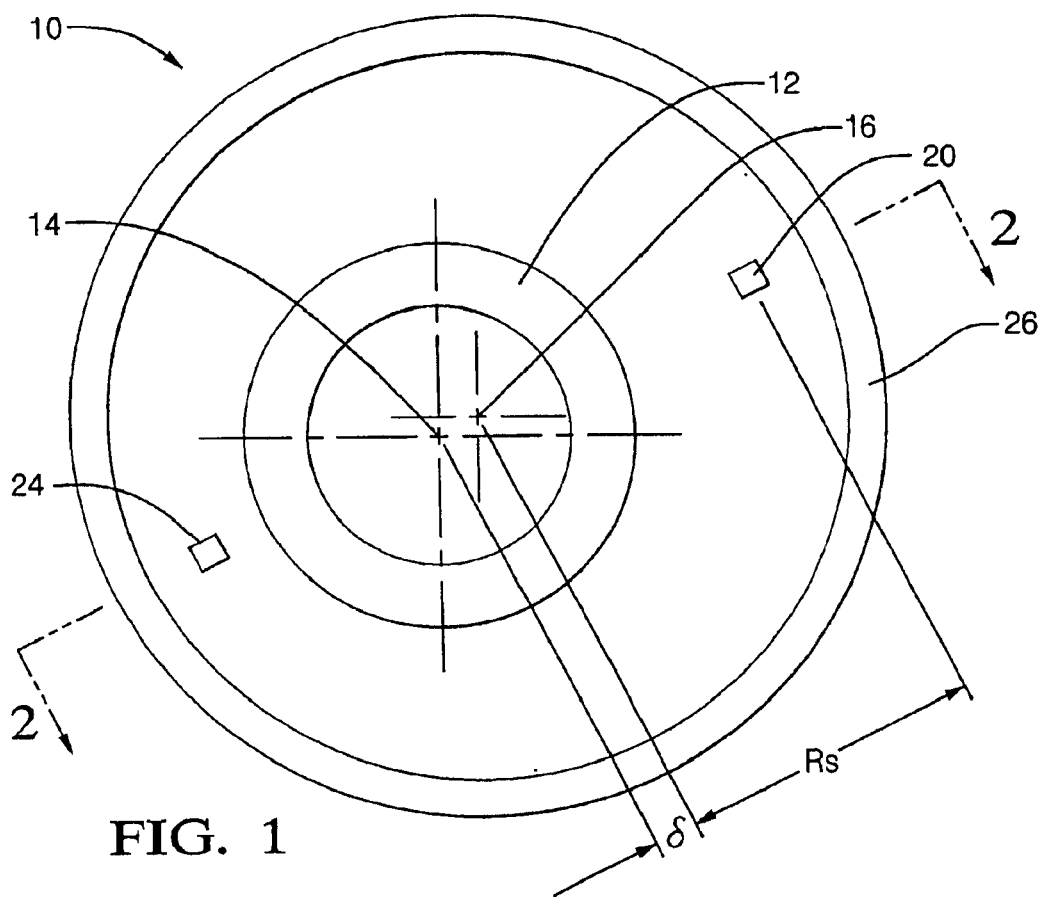
Figure 2:
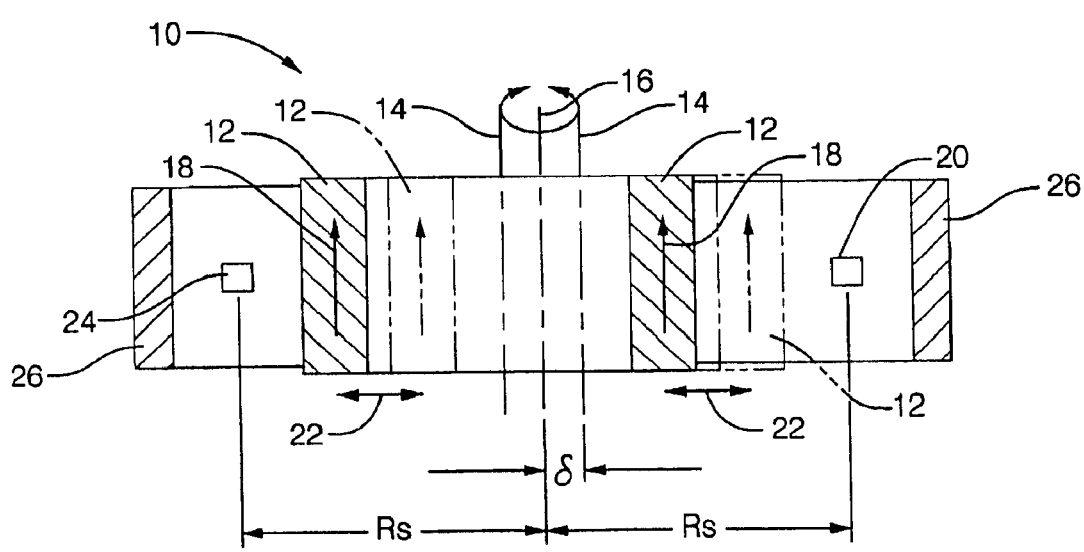

An exemplary embodiment of a sensor assembly 10 embodying aspects of the present invention is shown in FIG. 1 (top view), and in FIG. 2 (cross-sectional view). The sensor assembly 10 includes a cylindrical magnet 12. The cylindrical magnet defines a geometric axis 14, e.g., an axis corresponding to the physical (e.g., cylindrical) configuration of the magnet. Magnet 12 is positioned to rotate around an axis of rotation 16. The axis of rotation is placed at some non-zero distance 6 from the magnet axis 14. That is, the axis of rotation 16 and the geometric axis 14 are non-coincident with one another. In one preferred embodiment, the cylindrical magnet is magnetized generally axially, as represented by arrows 18 in FIG. 2. A second preferred embodiment with a generally radial magnetization is described below in the con text of FIGS. 7 and 8. It will be understood that either deviating by a few degrees from axial (or radial) magnetization, or appropriately combining axial and radial directions by a few or more than a few degrees, is specifically contemplated to be within the scope of the present invention. Thus, the terms axial or radial magnetization should not be construed as meaning exactly axial or exactly radial magnetization.

It will be now appreciated by those skilled in the art that axial magnetization may be preferable because it is easier to magnetize a cylindrical magnet along its axial direction than along its radial direction. For example, a plurality of discrete magnets having the appropriate axial magnetization may be stacked. In this exemplary magnet arrangement, there would be no dimensional restrictions relative to the length of the magnet and/or its inner radius from the point of view of establishing a magnetic flux of suitable strength. Conversely, with radial magnetization, the magnetizing flux would generally propagate through the inner radius from the top (or bottom) of the magnet thus placing practical restrictions on the magnet length and/or inner radius in order to establish a suitable magnetic flux.

Further, due to some practical consider ations, sensing the axial component of the magnetic flux may be more desirable, especially when a Hall sensing element or elements are used. This is because each Hall sensing element would sense the component of flux normal to its surface. Therefore, in order to sense the axial component of the magnetic flux, each sensing element could be laid in a plane coplanar with the magnet. The sensing element or sensing elements would thus be readily placed on a flat annular circuit board that can be easily staked during assembly along or on top (or bottom) of the magnet.

Referring to FIGS. 1 and 2, at least one magneto-sensitive sensing element 20 may be located at the periphery of the magnet 12. Examples of such a sensing element may be a linear, ratiometric-based Hall sensing element, e.g., Allegro part number A3517, or Melexis part number ML90215. In one exemplary embodiment, the sensing element is stationary and at a distance Rs from the axis of rotation of the magnet. Therefore, the spacing between the magnet outer surface and the sensing element would fluctuate from a distance (Rs+δ) to a distance (Rs−δ) as the magnet rotates, as represented by arrows 22 between the dashed and solid line representations of magnet 12. Although in one exemplary embodiment the magnet is rotatable relative to the sensing element, conceptually, the sensing element and/or magnet could be rotatable relative to one another.

If the magnet is magnetized axially, then the flux density in the sensing element would vary from a maximum (such as when the sensing element is closest to the magnet) to a minimum (such as when the sensing element is farthest to the magnet). More generally, the flux density in the sensing element may be described as a monotonous function indicative of the angular position of the magnet as it rotates.

In principle, a single sensing element 20 would be sufficient to detect the angular position of the magnet. However, it may be desirable to have at least two such sensing elements, e.g., sensing elements 20 and 24, preferably each located at the same distance Rs from the axis of rotation, but at different angular locations around the periphery of the magnet. Having at least two such sensing elements would allow eliminating or reducing common mode variation, such as may be induced due to factors like magnet strength, temperature sensitivity, etc. This would be achieved by mathematically combining the sensing element outputs in any suitable manner.

In one exemplary embodiment, the two sensing elements 20 and 24 may be located 180° apart from one another, and the mathematical combination of their respective output signal may include the operations of subtraction and/or addition. That is, additive combining and/or differential combining.

It was found that the difference of the output signals when the sensing elements are spaced apart 180° is generally linear as a function of angular position. It will be appreciated that achieving good linearity is a desirable feature in sensors of this type. It was also found that the sum of the output signals when the sensing elements are spaced apart 180° substantially approximates a sinusoidal waveform, with a frequency double that of the rotation frequency of the magnet. This is also a desirable feature for many sensing applications.

The foregoing features have been analytically demonstrated through a finite element model of a prototype exemplary sensor. Exemplary dimensions used for the calculations were as follows: Rs=27 mm, δ=3 mm, magnet outside radius=21 mm, magnet inside radius=18 mm, magnet length=6 mm. It will be appreciated that the present invention is not limited to the foregoing dimensions since other dimensional configurations would work equally effectively.

Figure 3:
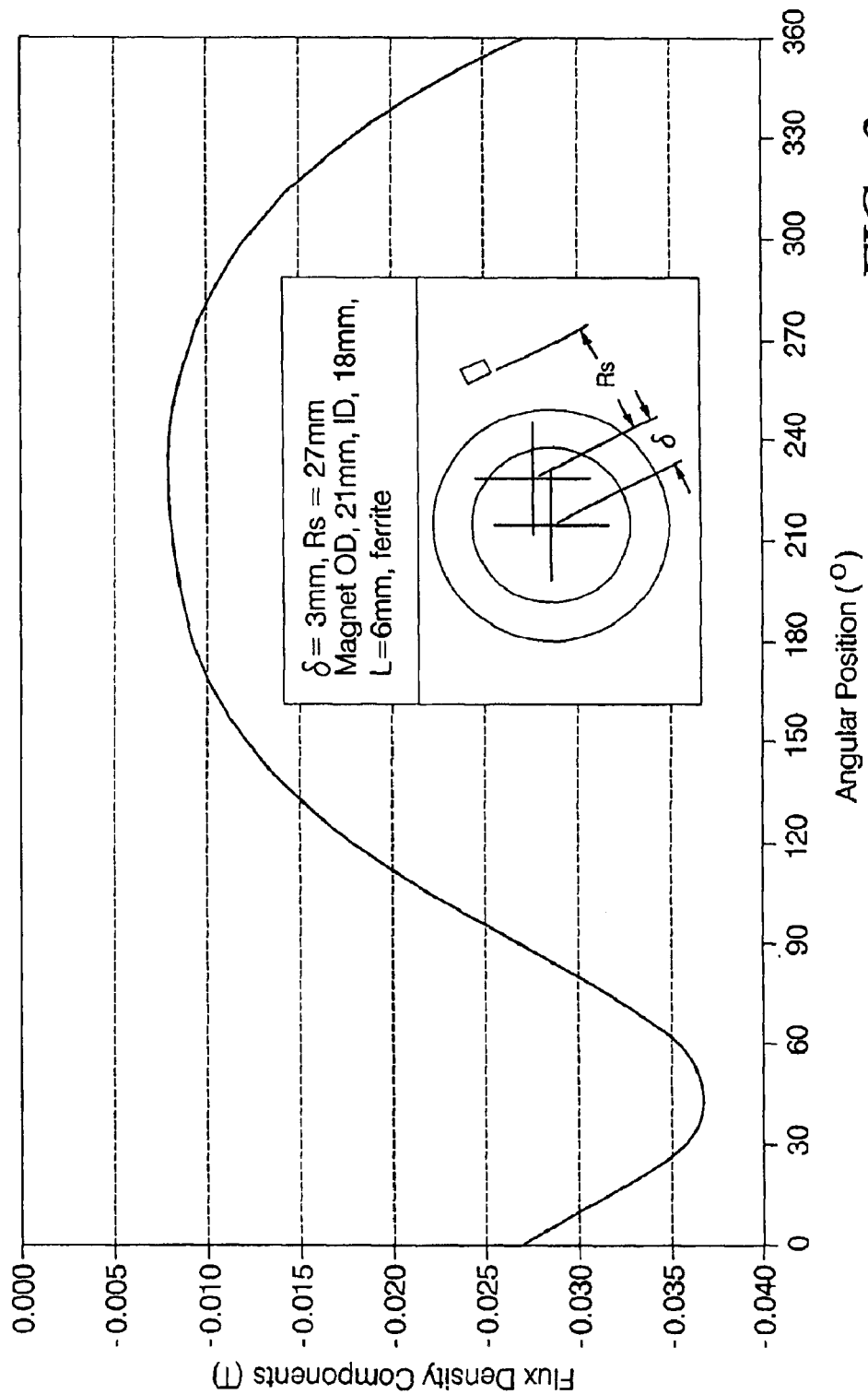
FIG. 3 shows an exemplary waveform for the axial component of flux density sensed in a single sensing element as the magnet rotates.

FIG. 3 shows an exemplary waveform for the axial component of flux density sensed in one of the sensing element 20 or 24 as the magnet rotates.

Figure 4:
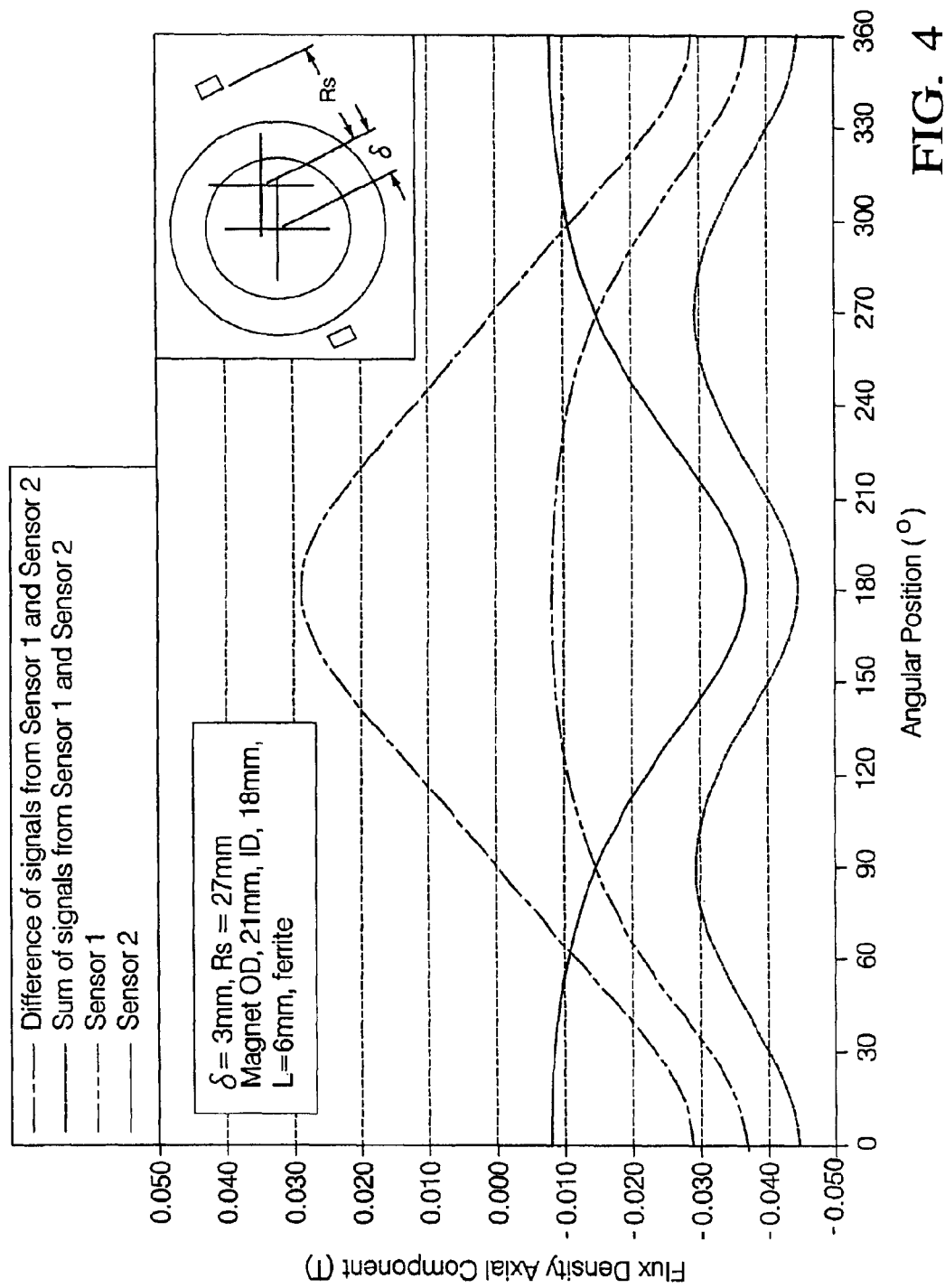
FIG. 4 shows each individual waveform for the axial component of flux density sensed with two sensing elements located 180° apart from one another.
Figure 5:
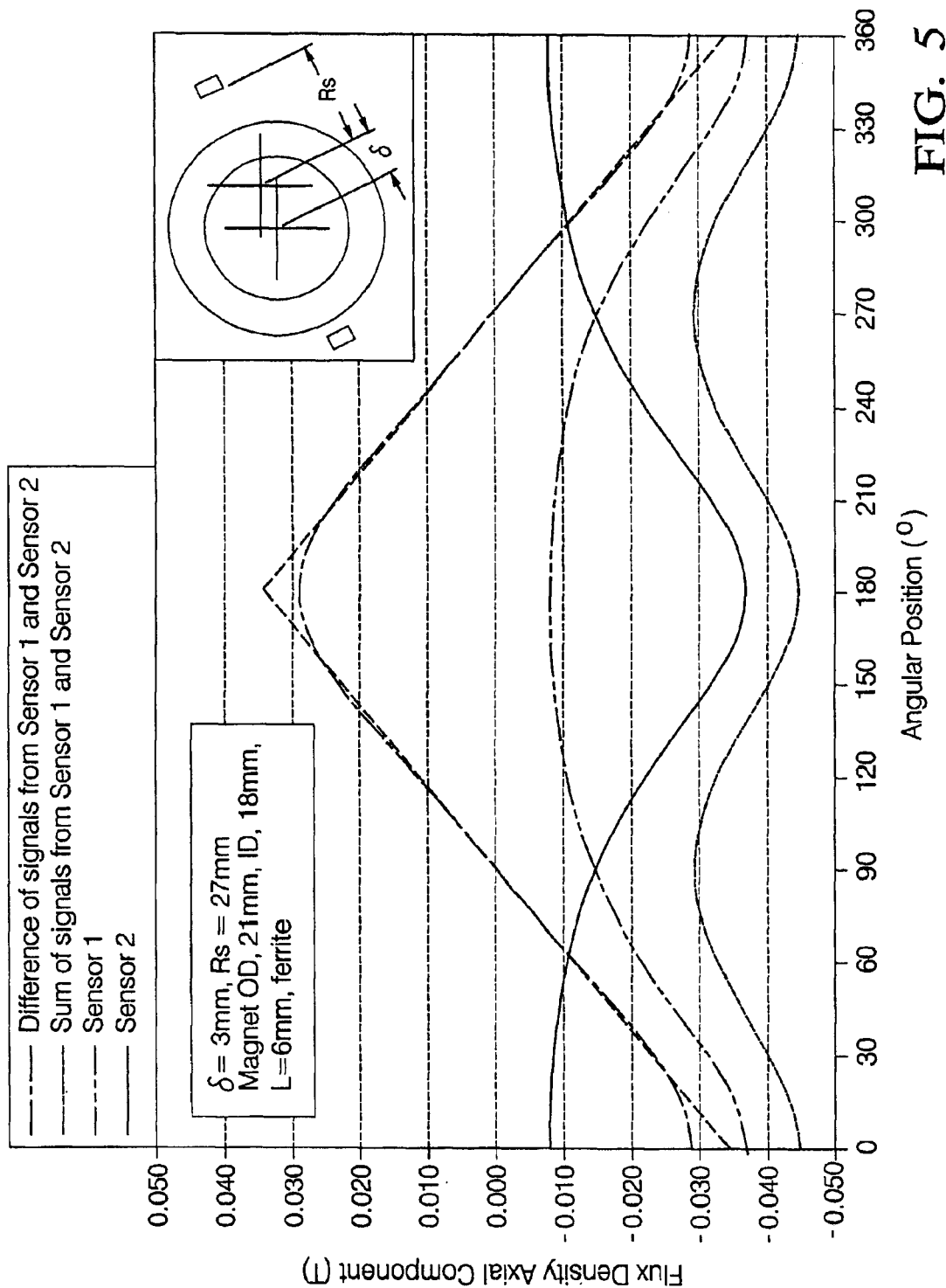
FIG. 5 shows exemplary waveforms that may allow qualitatively appreciating the respective levels of linear and sinusoidal approximations present in the exemplary waveforms of FIG. 4.

FIG. 4 shows each individual waveform for the axial component of flux density sensed with two sensing elements (e.g., sensing elements 20 and 24) located 180° apart. Also shown in FIG. 4 are respective waveforms comprising the difference between the two signals, and the sum of the two signals. It will be appreciated that the difference output waveform exhibits a substantially linear response over most of the range (except around the angular positions corresponding to 0° and 180°). These two positions respectively correspond to the "apogees" and "perigees" of the magnet as it rotates vis-à-vis the two sensing elements. It will be further appreciated that the sum output waveform of the two signals approximates a sinusoidal, with twice the frequency of rotation. The level of the linear and sinusoidal approximations may be qualitatively appreciated from the exemplary waveforms illustrated in FIG. 5, where two ideal functions, one linear, and the other sinusoidal, are juxtaposed for comparative purposes with the sensor output waveforms shown in FIG. 4.

Location of the Sensing Elements

Figure 6:
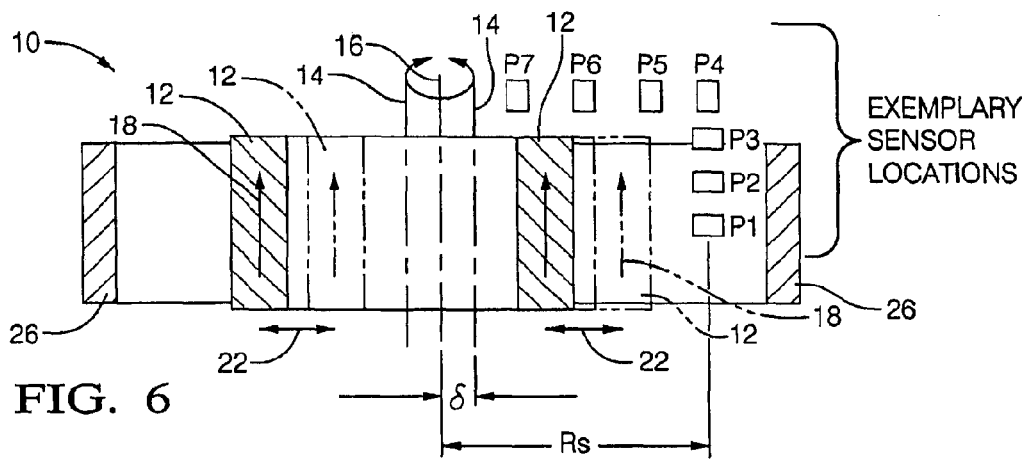
FIG. 6 illustrates some exemplary sensing locations for the sensing element/s.

The sensing element is may be located at the periphery of the magnet. Various actual locations are thus available providing welcomed flexibility to the designer. Some exemplary sensing locations, denoted P1 to P7, are shown in FIG. 6. Other possible locations, not shown, can be deduced by symmetry, for instance below the magnet. It will be understood that each of such positions are within the scope of this invention.

When the magnet is magnetized axially, one preferred location might be location P1, e.g., approximately halfway along the height of the magnet. With an axial magnetization, the sensing element at location P1 should be laid in such a way as to sense the axial component of flux density. There, this axial component would be strongest and the other components of flux density would be relatively small. In one exemplary embodiment, the distance Rs between the sensing element and the axis of rotation may be chosen as the smallest distance possible. That is, a distance that comes as close as practical relatively to the magnet "perigee". Larger distances, even if the sensing element is several millimeters away from the magnet at its perigee, are possible as well, though the larger distance Rs becomes, the smaller the magnitude of the output signal from the sensing element.

Other locations along the height of the magnet, for instance locations P2, or P3, are possible. Location P3 is generally level relative to the top of the magnet, and location P2 may be anywhere between locations P1 and P3. These locations might be less desirable because the sensed axial component of flux becomes smaller, and the other components larger.

Locations above the magnet are also possible. Most notably, location P4 is above the magnet (above by about say, 1 or 2 mm), but also outside of the magnet range of motion (at a similar distance Rs as in position P1). At that location, however, the flux may be turning and would be predominantly radial. Therefore, the sensing element should be placed to sense the radial component of flux density. Desirably, similar signal waveforms have been observed in location P4 as the waveform shown in FIG. 3. Therefore, signal subtracting and summing with another sensing element located 180° away would also be available in this case.

Other locations, P5, P6, and P7, along either the top or bottom bases of the cylinder are also possible. These locations would be directly above (or below) the magnet. For example, location P5 may be aligned with the magnet outer edge at its maximum position, and location P7 may be aligned with its inner edge at its minimum position. Location P6 is anywhere in between locations P5 and P6. Other positions, beyond location P7 towards the center, or beyond location P6 toward location P4 are also possible. In those cases, however, the output signal waveform would be different from the one shown in FIG. 3. Other techniques of signal capture might be necessary. Exemplary techniques for performing information extraction in those cases may be as disclosed in U.S. patent application Ser. No. 09/557,390, filed 24/APR/2000, titled, "Non-Contact Position Sensor Assembly", commonly assigned to the same assignee of the present invention and herein incorporated by reference. Importantly, such sensors would still fall under the scope of this invention inasmuch as the design relies on the novel idea of a magnet rotating eccentrically. Table 1 below summarizes four exemplary general configurations:

TABLE 1

| Magnetization Direction | Sensor Location | Sensor Layout (If Hall sensor) | Desirability |
|---|---|---|---|
| Axial | P1–P3 | Coplanar with magnet | First most desirable |
| Axial | P4–P7 | Perpendicular to magnet plane | Second most desirable |
| Radial | P4–P7 | Coplanar with magnet | Third most desirable |
| Radial | P1–P3 | Perpendicular to magnet plane | Fourth most desirable |

Construction with a (Partial) Steel Enclosure

Aspects of the present invention contemplate a sensor assembly with an optional electromagnetic interference (EMI) shielding structure around it. An example of such an optional structure may be a ring 26, as shown in FIGS. 1 and 2, made of steel or any other ferromagnetic material. Such a steel ring would be concentric with the axis of rotation of the magnet. The presence of ring 26 may somewhat reduce the signal strength of the magnetic flux, but would not change the overall characteristics of the signal pattern. Therefore, this embodiment would be useful in cases where external magnetic fields are expected, such as in an electric motor, etc. The shielding structure could be as high as the magnet, or shorter or longer depending on the application. It may be close to the sensing element(s), or at some distance from them. It would actually be preferable to have the ring farther from the sensing element(s), as this would reduce the output signal to a lesser extent, while providing a similar level of shielding. However, a larger distance would increase the overall sensor size. This ring though desirable in many cases is just optional. The shielding structure may assume a variety of actual shapes, preferably circular on the inside but of any shape (not necessarily circular) on the outside, whatever might be convenient for any given application.

Another example of the EMI shield structure may be a plate above the magnet, or two plates, one above and one below the magnet. A plate might be preferable if the sensing element is located above the magnet (e.g., locations P4 to P7, as discussed above). It will be appreciated that the shielding structure should not enclose the magnet and sensor completely, because this would short out the magnet flux. Therefore, a more general descriptor for this aspect would be a partial ferromagnetic enclosure around the sensor assembly.

Summarizing, a desirable exemplary embodiment with an axial magnetization pattern would include location P1 for the sensing element(s), and optionally a ring as a "partial steel enclosure". Such a design would have the advantage of comprising successive annular rings, first the rotating magnet on the inside, then a circuit board or equivalent structure to support the sensing element(s), and finally a steel ring on the outside.

Embodiments with Radial Magnetization of the Magnet (Second Preferred Embodiment)

Figure 7:
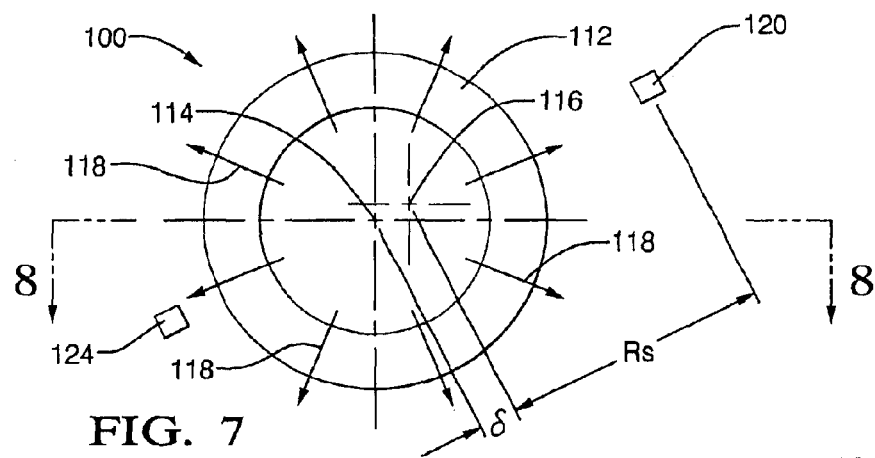
Figure 8:
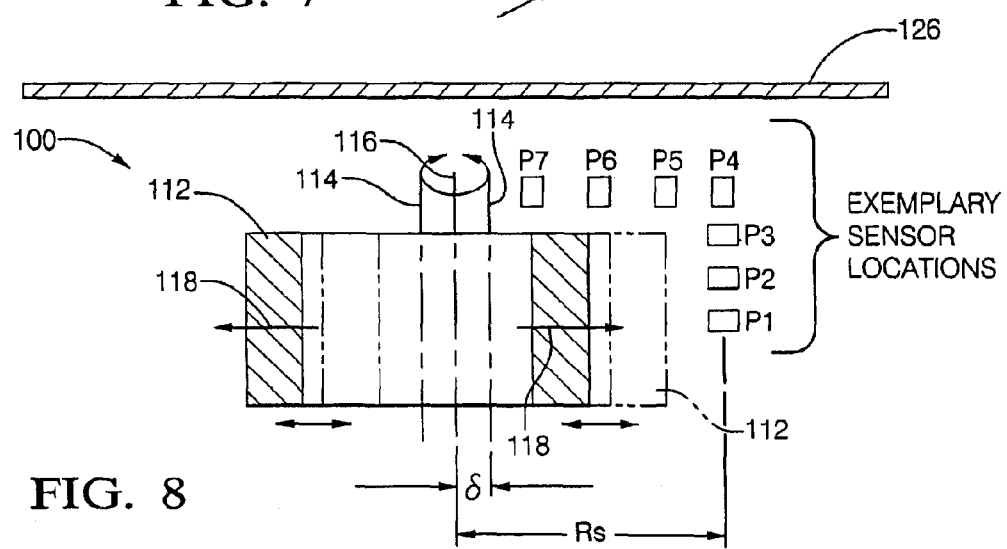

Since magnetic fields are generally symmetric, aspects of the present invention further recognize that similar flux patterns as those discussed above may be obtained with a radial magnetization of the magnet, as shown in a sensor assembly 200 in FIGS. 7 and 8. The reference numerals for the elements of sensor assembly 100 shown in FIGS. 7 and 8 counterpart to those already described in the context of FIGS. 1 and 2 have just been incremented by the number 100 relative to the reference numerals shown in FIGS. 1 and 2.

Radial magnetization means a magnetization pattern that generally follows radii from the magnet center. See arrows 118 in FIGS. 7 and 8. Comparing radial and axial magnetization means that all components of flux density at any point would just be "rotated" by 90°. This means that where an axial component of flux produces a given output pattern due to axial magnetization of the magnet, the radial component of flux density will produce the same output pattern due to radial magnetization. That is, the 90° rotation would not affect the features of the output pattern.

As a corollary, with radial magnetization, assuming the sensing element is located in location P1, then this sensing element would have to be positioned such as to sense the radial component of flux density. Similarly, if the sensing element is located in location P4, such element would be positioned such as to sense the turning component (in this case the axial component) of flux density.

One exemplary embodiment with a radial magnetization pattern would include location P4 for the sensing element(s), and a plate 126 (as shown in FIG. 8) as a "partial shielding structure" for EMI purposes. Such an embodiment would have the advantage of being planar, that is, it could be assembled by stacking the magnet, sensing element(s), and plate, in successive layers.

Magnet shape: In one exemplary embodiment, the magnet may be cylindrical in shape. It may be a hollowed angular ring as shown in the figures, or a solid slug (i.e., inside diameter=0). Also, the outer diameter may preferably be a circle. However, other shapes are possible while maintaining the "cylindrical" shape of the concept (inasmuch as a cylinder is defined as having an outside surface made of lines parallel to the cylinder axis). Then, the signal pattern (shown in FIG. 3), as well as the patterns of the sum and differences of signals shown in FIG. 4, would accordingly change, and any specific pattern of interest for a particular application may be obtained.

Assuming the magnet comprises a ring defining a non-zero inside diameter, then the inside of the magnet may be filled with various materials, including magnetic materials such as steel. Then the magnet can be easily incorporated on a rotatable shaft, such as the shaft of a motor.

Figure 9:
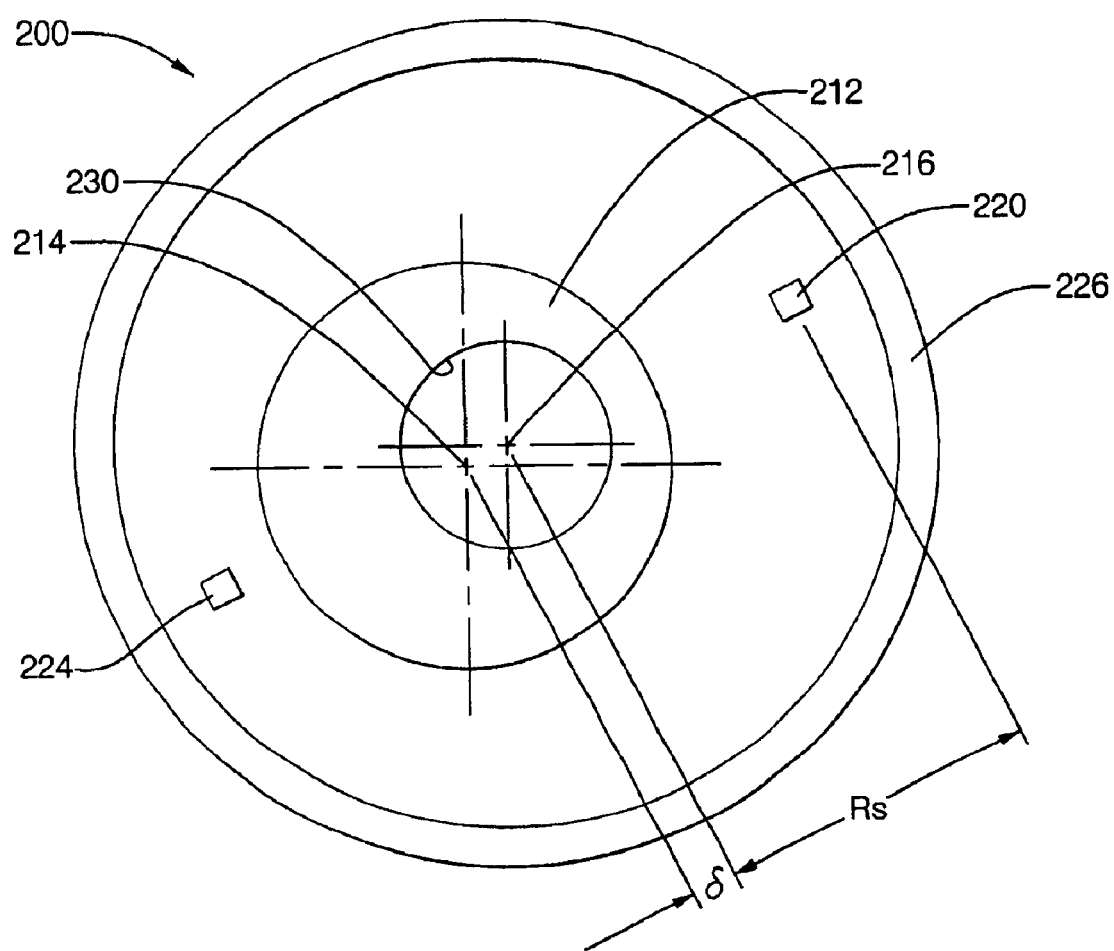
FIG. 9 illustrates a schematic of a sensor assembly configured so that a bore within a cylindrical magnet may be eccentrically situated relative to the outer surfaces of the cylinder.

Magnet with non-concentric inside and outside surfaces: In order to simplify construction and assembly processes, in yet another aspect of the present invention illustrated in FIG. 9, a sensor assembly 200 may be configured so that a bore 230 within a magnet 212 may be eccentrically situated relative to magnet axis 214. Bore 230 may be centered relative to the axis of rotation 216. The magnet would have the configuration shown in FIG. 9 and this would allow for directly mounting the magnet onto the rotating shaft. Finite element analysis performed for the exemplary embodiment shown in FIG. 9 shows no discernable difference relative to embodiments comprising a magnet having concentric inside and outside surfaces. The reference numerals for the elements of sensor assembly 200 shown in FIG. 9 counterpart to those already described in the context of FIGS. 1 and 2 have just been incremented by the number 200 relative to the reference numerals shown in FIGS. 1 and 2.

Exemplary Dimensions: In studies conducted to date, it has been found that a distance δ between the two axes on the order of about 2 to 4 mm is satisfactory. A smaller distance δ would lead to smaller magnitude output signals, and a larger distance δ would increase for an overall large sensor, e.g., larger sensor footprint. The length of the magnet may be very small (e.g., approximately 1 or 2 mm), or much larger (e.g., approximately 5 mm or more). Generally, the distance Rs between the sensing element and the center of rotation would have to be at least equal to (δ+magnet outside radius), so that the magnet can rotate without interfering with the sensing element. In fact, a practical value for distance Rs is (δ+magnet outside radius+a predefined tolerance). It will be appreciated, however, that larger values of distance Rs would be satisfactory as well. Shorter values of distance Rs could also be considered, for instance for those cases where the sensor angular range is less than a full rotation (<360°).

Assembly with a gear: The magnet may also be mounted on a gear, such as for example a planetary gear. Then, one rotation of the magnet may correspond to several rotations of the shaft. This would be useful for instance for steering-wheel position sensors. The gear, then, could possibly be mounted inside the magnet (planetary gear, harmonic drive, etc.).

Non-parallel axes: Finally, the figures used for describing exemplary embodiments of the present invention show the axis of rotation and the magnet axis to comprise parallel axes. It will be understood however, than in its more general form, aspects of the present invention are based on these two axes being distinct from one another. Consequently, axes that are distinct and not necessarily parallel with one another are specifically contemplated to be within the scope of the present invention.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim:

1. A sensor assembly for sensing angular position of an object, the assembly comprising:
   at least one magneto-sensing element having a first axis of rotation; and
   a magnet having a second axis of rotation, wherein at least one of the magnet and the magneto-sensing element are rotatable relative to the other, wherein the respective axes of rotation of the magneto-sensing element and the magnet are non-coincident with respect to one another, and further wherein the magnet comprises a cylindrical magnet magnetized along a radial direction and the at least one magneto-sensing element is positioned adjacent along the length of the cylinder to sense a radial flux component.

2. The sensor assembly of claim 1 wherein the at least one magneto-sensing element produces an output signal indicative of angular position in response to one of the following components of magnetic flux from the magnet: an axial flux component and a radial flux component.

3. The sensor assembly of claim 1 wherein said at least one magneto-sensing element comprises a pair of magneto-sensing elements co-planarly positioned 180 degrees apart around the magnet.

4. The sensor assembly of claim 3 further comprising a subtractor for differentially combining the respective output signals from the pair of magneto-sensing elements, wherein the resultant signal comprises a linearly varying signal indicative of angular position.

5. The sensor assembly of claim 3 further comprising a summer for additively combining the respective output signals from the pair of magneto-sensing elements, wherein the resultant signal comprises a sinusoidally varying signal indicative of angular position.

6. The sensor assembly of claim 1 wherein the cylindrical magnet comprises a bore concentrically situated relative to an outer surface of the cylinder.

7. The sensor assembly of claim 1 wherein the cylindrical magnet comprises a bore eccentrically situated relative to an outer surface of the cylinder.

8. The sensor assembly of claim 1, further comprising a shielding structure for partly enclosing the sensor assembly.

9. A sensor assembly for sensing angular position of an object, the assembly comprising:
   at least one magneto-sensing element; and
   a cylindrical magnet having an axis of rotation and a geometrical axis, wherein the magnet is rotatable relative to the at least one magneto-sensing element, wherein the geometric and rotation axes of the magnet are non-coincident with respect to one another, and further wherein the magnet comprises a cylindrical magnet magnetized along a radial direction and the at least one magneto-sensing element is positioned adjacent along the length of the cylinder to sense a radial flux component.

10. A sensor assembly for sensing angular position of an object, the assembly comprising:

at least one magneto-sensing element; and a cylindrical magnet having an axis of rotation and a geometrical axis, wherein the magnet is rotatable relative to the at least one magneto-sensing element, wherein the geometric and rotation axes of the magnet are non-coincident with respect to one another, and further wherein the magnet comprises a cylindrical magnet magnetized along a radial direction and the at least one magneto-sensing element is positioned adjacent along at least one of the bases of the cylinder to sense an axial flux component.

11. A sensor assembly for sensing angular position of an object, the assembly comprising:

at least one magneto-sensing element having a first axis of rotation; and a magnet having a second axis of rotation, wherein at least one of the magnet and the magneto-sensing element are rotatable relative to the other, wherein the respective axes of rotation of the magneto-sensing element and the magnet are non-coincident with respect to one another, and further wherein the magnet comprises a cylindrical magnet magnetized along a radial direction and the at least one magneto-sensing element is positioned adjacent along at least one of the bases of the cylinder to sense an axial flux component.

12. The sensor assembly of claim 11 wherein the at least one magneto-sensing element produces an output signal indicative of angular position in response to one of the following components of magnetic flux from the magnet: an axial flux component and a radial flux component.

13. The sensor assembly of claim 11 wherein said at least one magneto-sensing element comprises a pair of magneto-sensing elements co-planarly positioned 180 degrees apart around the magnet.

14. The sensor assembly of claim 11 wherein the cylindrical magnet comprises a bore concentrically situated relative to an outer surface of the cylinder.

15. The sensor assembly of claim 11 wherein the cylindrical magnet comprises a bore eccentrically situated relative to an outer surface of the cylinder.

16. A sensor assembly for sensing angular position of an object, the assembly comprising:

at least one-magneto-sensing element having a first axis of rotation;

a cylindrical magnet having a second axis of rotation, wherein at least one of the magnet and the magneto-sensing element are rotatable relative to the other, wherein the respective axes of rotation of the magneto-sensing element and the magnet are non-coincident and parallel with respect to one another, wherein the magnet is magnetized along one of the following directions: an axial direction and a radial direction, and further wherein the cylindrical magnet comprises an eccentrically situated bore; and a rotatable shaft affixedly mounted in said eccentrically situated bore.

17. The sensor assembly of claim 16 wherein the at least one magneto-sensing element produces an output signal indicative of angular position in response to one of the following components of magnetic flux from the magnet: an axial flux component and a radial flux component.

18. The sensor assembly of claim 16 wherein said at least one magneto-sensing element comprises a pair of magneto-sensing elements co-planarly positioned 180 degrees apart around the magnet.

19. The sensor assembly of claim 16 wherein the magnet comprises a cylindrical magnet magnetized along an axial direction and the at least one magneto-sensing element is positioned adjacent along the length of the cylinder to sense an axial flux component.

20. The sensor assembly of claim 16 wherein the magnet comprises a cylindrical magnet magnetized along an axial direction and the at least one magneto-sensing element is positioned adjacent along at least one of the bases of the cylinder to sense a radial flux component.

21. The sensor assembly of claim 16 wherein the magnet comprises a cylindrical magnet magnetized along a radial direction and the at least one magneto-sensing element is positioned adjacent along the length of the cylinder to sense a radial flux component.

22. The sensor assembly of claim 16 wherein the magnet comprises a cylindrical magnet magnetized along a radial direction and the at least one magneto-sensing element is positioned adjacent along at least one of the bases of the cylinder to sense an axial flux component.

23. The sensor assembly of claim 16 further comprising a shielding structure for partly enclosing the sensor assembly.

24. A sensor assembly for sensing angular position of an object, the assembly comprising:

at least one magneto-sensing element;

a cylindrical magnet having an axis of rotation and a geometrical axis, wherein the magnet is rotatable relative to the at least one magneto-sensing element, wherein the geometric and rotation axes are non-coincident and parallel with respect to one another, wherein the magnet is magnetized along one of the following directions: an axial direction and a radial direction, and further wherein the cylindrical magnet comprises an eccentrically situated bore; and a rotatable shaft affixedly mounted in said eccentrically situated bore.

* * * * *